Figure 1:
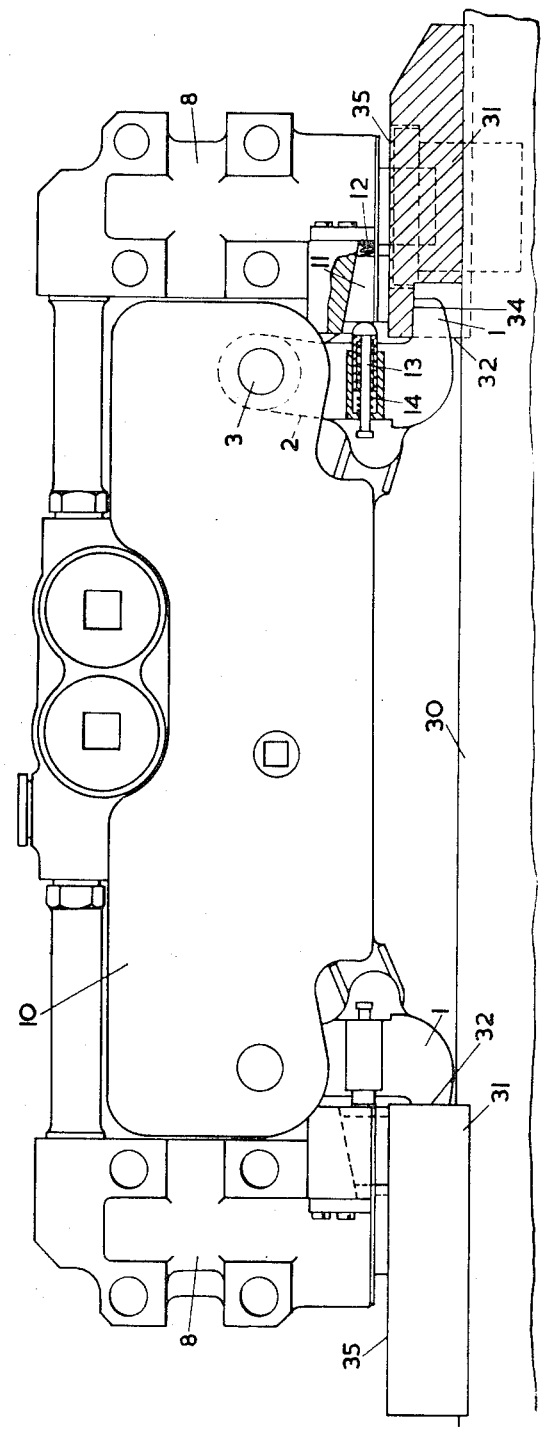

United States Patent [19]
Newell

[11] 3,784,132

[45] Jan. 8, 1974

[54] EJECTOR RELEASE UNITS

[75] Inventor: Cyril Newell, Odiham, England

[73] Assignee: The Secretary of State for Defense in Her Britannic Majesty's Government of the United Kingdom of Great Britain and Northern Ireland, London, England

[22] Filed: Mar. 20, 1972

[21] Appl. No.: 236,387

[30] Foreign Application Priority Data
Mar. 25, 1971 Great Britain..................... 7,772/71

[52] U.S. Cl............................. 244/137 R, 89/1.5 F
[51] Int. Cl............................................... B64d 1/02
[58] Field of Search............................... 244/137 R; 194/83 AE; 89/1.5 R, 1.5 F, 1.5 G, 1.5 B, 1.606

[56] References Cited
UNITED STATES PATENTS
3,268,188  8/1966  La Roe et al. .................. 244/137 R
3,610,094  10/1971  Craigie ............................. 89/1.5 F
FOREIGN PATENTS OR APPLICATIONS
1,450,961  8/1966  France............................... 89/1.5 F Primary Examiner—Duane A. Reger
Assistant Examiner—Galen L. Barefoot
Attorney—Stevens, Davis, Miller and Mosher

[57] ABSTRACT

An ejector release unit, for carrying aircraft stores such as bombs, enables securing and crutching of a store to be accomplished in one manoeuvre. The store must have two saddles spaced apart thereon, with store-facing surfaces on the saddle. The preferred release unit has two hooks for each saddle, the hooks engaging the store-facing surfaces. Wedges between the top of each saddle and structure of the unit are forced into engagement with saddle and structure by spring loaded plungers associated with the hooks. A manually operable crank and lever arrangement allows hooks to be engaged or disengaged with a store, and plungers to be engaged with or disengaged from wedges as required. Any movement of store relative to unit after engagement results in tightening of the wedges. Operationally stores are released by a cartridge operated piston acting on the crank.

3 Claims, 9 Drawing Figures

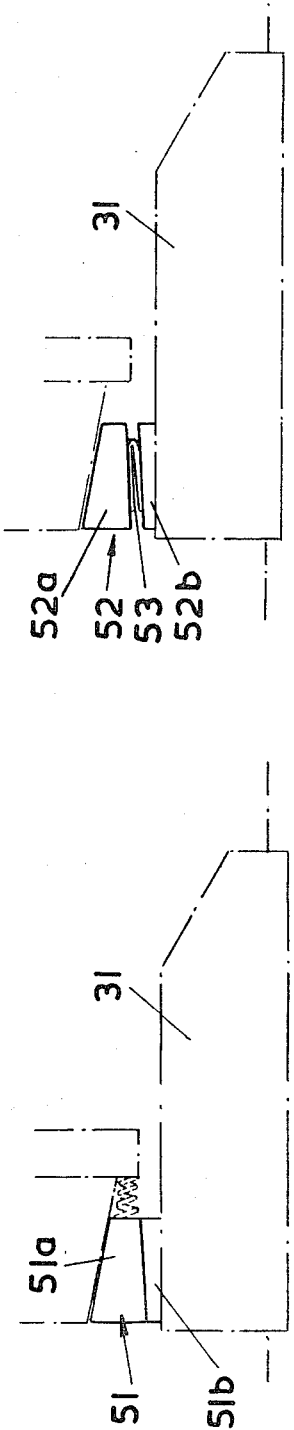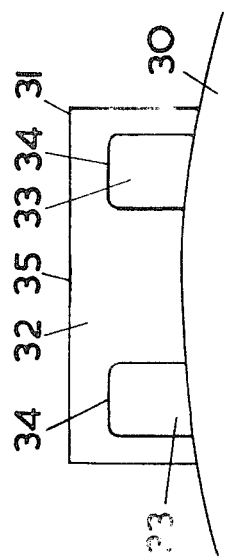

EJECTOR RELEASE UNITS

The present invention relates to store ejector release units for aircraft.

Ejector release units are used for carrying jettisonable stores, such as bombs and weapon carriers, either internally or externally to an aircraft. Conventionally each unit comprises a pair of hooks which mate with lugs secured to a store. To eject the store the hooks are withdrawn and simultaneously a pair of ejector rams act on the store to force it away from the release unit. The lugs are mounted along the longitudinal axis of the store and consequently means are required to hold the store rigid against side loads such as inertia loads caused by, for example, rolling of the aircraft or vibration. The usual means is a crutching system comprising four reaction pads, symmetrically disposed two on each side of the longitudinal axis of the store, which bear against the surface of the store. To ensure rigidity, each pad is loaded, the load being known as a crutch load. The process of engaging the hooks and applying the crutch loads on a store is time consuming, and also release units as described are bulky and, where carried externally, drag-inducing.

This invention provides a release unit which enables a store to be attached quickly and securely.

According to the invention a store ejector release unit, for use with a store having at least one saddle secured at each of two longitudinally separated sites thereon, includes; at least one support member to be associated with each saddle and actuating means for moving the support members between positions where each support member engages a store-facing surface of a saddle and positions where the support members disengage the saddles; and at least one wedge to be associated with each longitudinal saddle site and pressure means for urging the wedge into engagement between a saddle and structure of the release unit when the support members are in the engaged position.

A preferred embodiment of the invention has two support members, each in the form of a hook at one end of a pivoted arm, acting in side by side relationship, a single saddle, and two wedges at each of the longitudinal saddle positions.

Preferably, the means for urging the wedges into engagement comprise spring loaded plungers.

Figure 3:
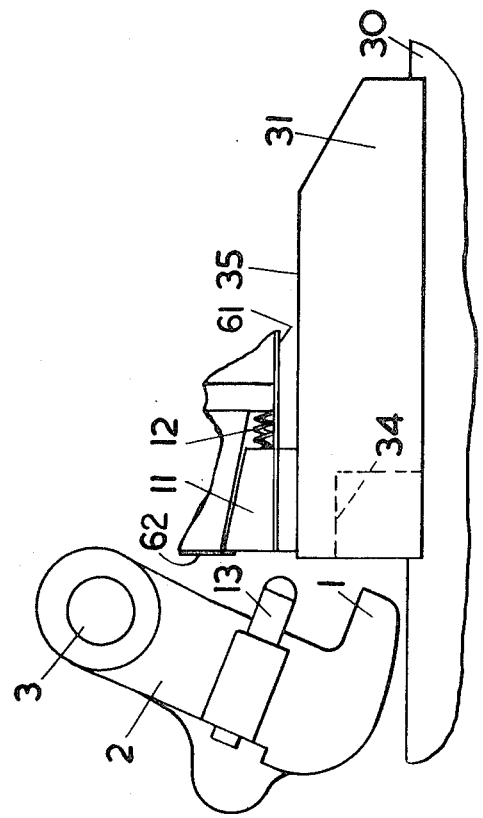
Figure 2:
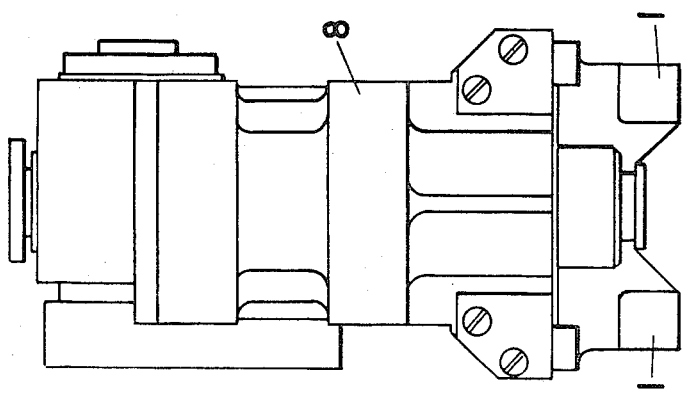
Figure 5:
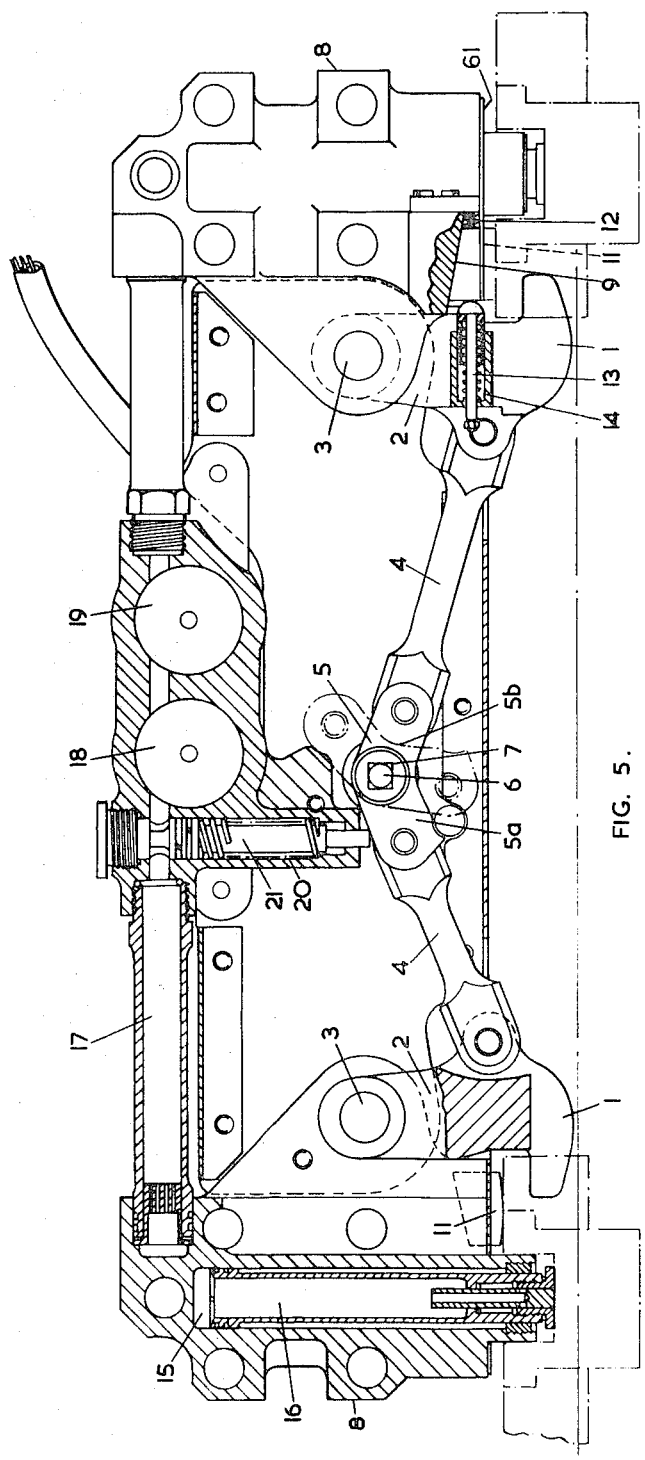
Figure 5A:
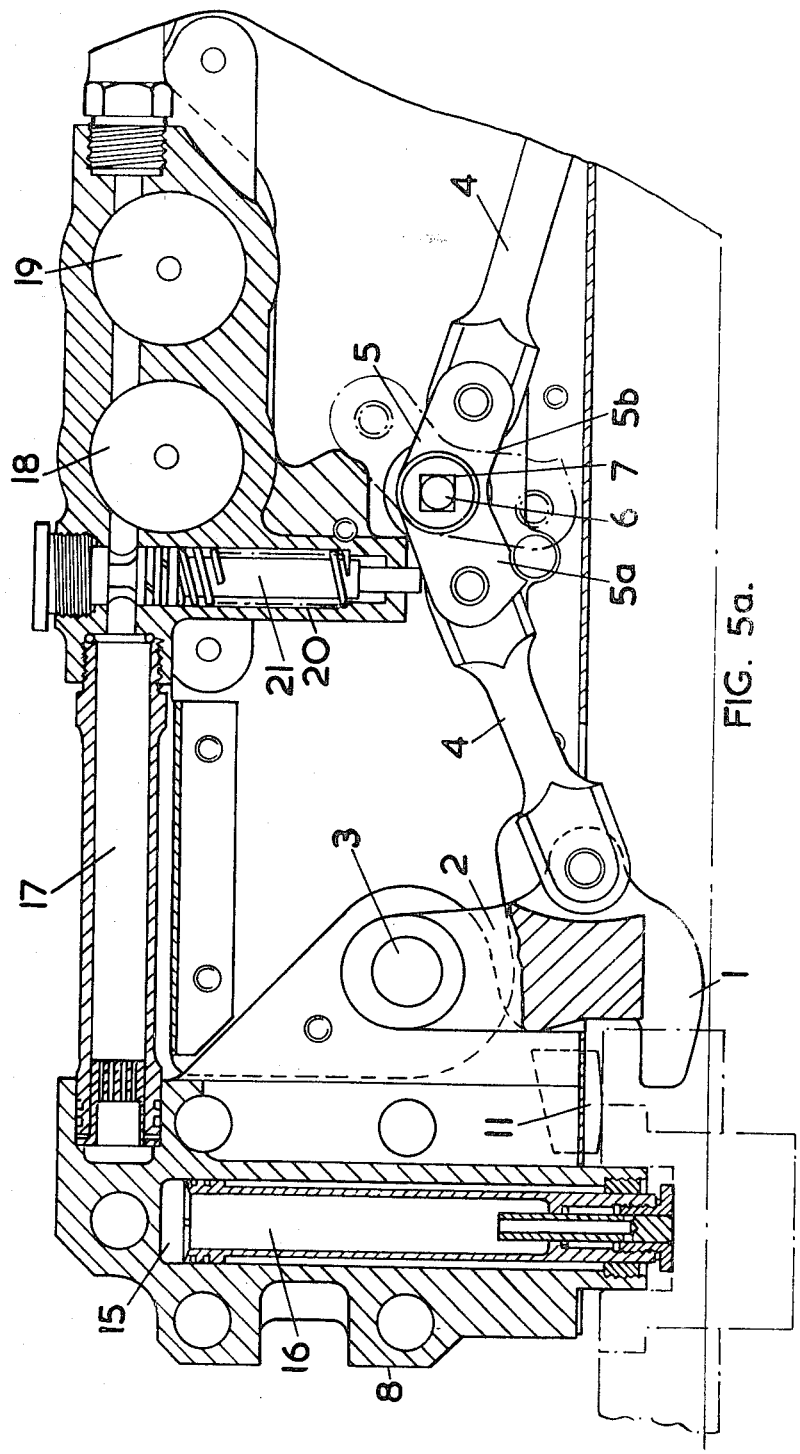
Figure 5B:
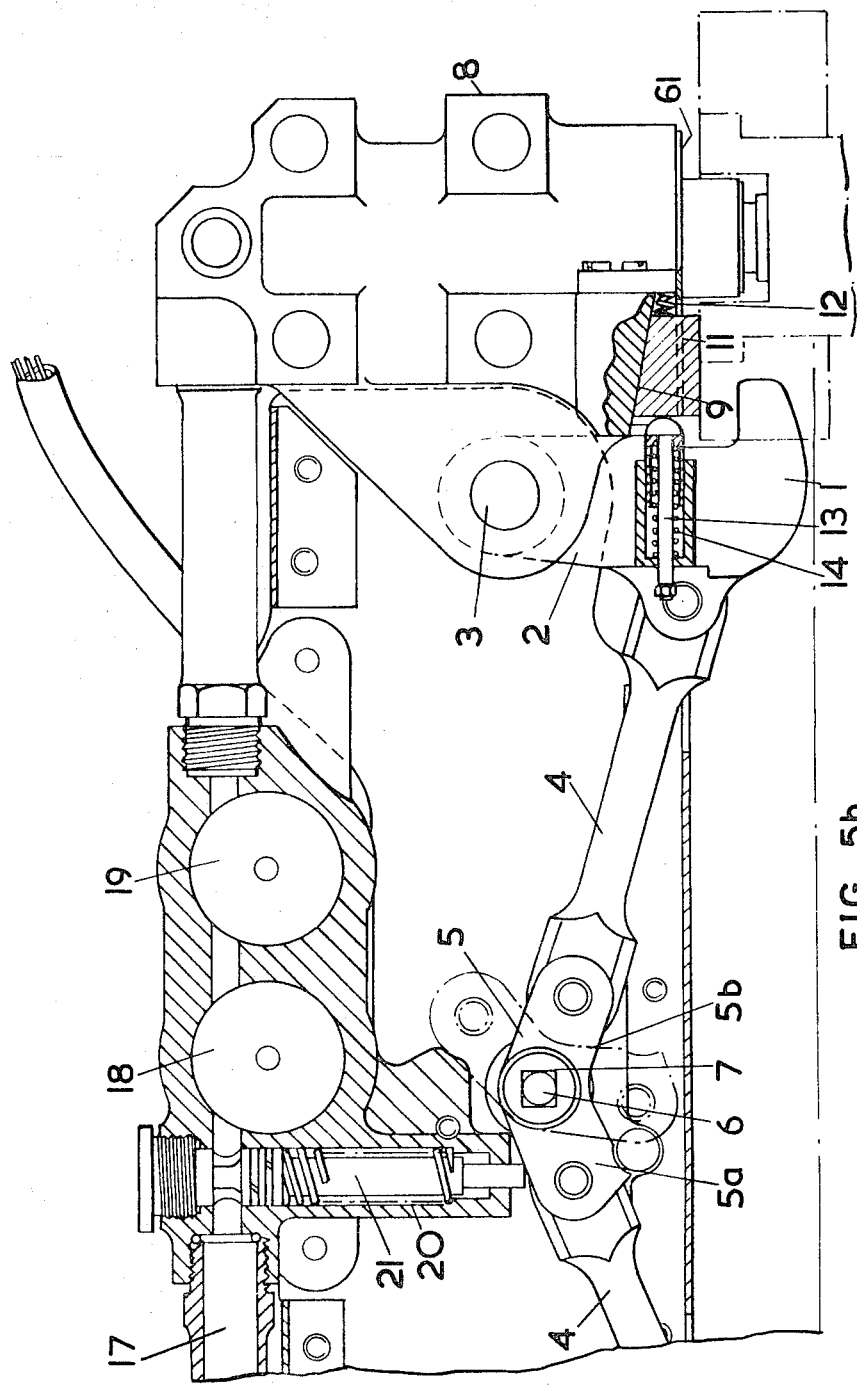

One embodiment of the invention will now be described, by way of example only, with reference to the accompanying drawings, of which;

FIG. 1 shows in elevation and partly in section an ejector release unit with a store attached, and the support members and wedges in the engaged position, FIG. 2 shows an end view of the unit taken in the direction of the arrow X on FIG. 1, FIG. 3 shows diagrammatically a support member and a wedge in the disengaged position, FIG. 4 shows an end view of a saddle on a store, FIGS. 5, 5(a) and 5(b) show in section a mechanism whereby the support members and wedges may be moved between the engaged and the disengaged position or vice versa, and FIGS. 6(a) and 6(b) show two alternative wedge constructions.

An ejector release unit having a body 10 carries a pair of support members in the form of hooks 1, of which one of each pair is shown in FIGS. 1 and 5, adjacent each end of the body 10. Each hook 1 is mounted at one end of an arm, such as that shown at 2 in FIG. 1, and each pair of arms 2 is rotatable about a pivot such as that shown at 3. The hooks 1 of each pair face away from the hooks 1 of the other pair, as shown in FIG. 1.

Adjacent the hook 1 end of each arm 2 is connected one end of a connecting rod such as those shown at 4 in FIG. 5. The other ends of the connecting rods 4 are connected to an actuating crank 5. The crank 5 has two lever arms 5(a), 5(b) disposed one on each side of a pivot point 6, the connecting rods 4 from one pair of arms 2 going to one lever arm 5a or 5b. The crank 5 also has a square key hole 7 centred on the pivot point 6. The crank 5 is moveable between two limiting positions. One of these is shown in full lines in FIG. 5, and the corresponding position of the arms 2 and hooks 1 is referred to as the engaged position. The other crank 5 limiting position is shown in dotted lines in FIG. 5, the corresponding position of the arms 2 and hooks 1 being referred to as the disengaged position.

At the extremities of the body 10 are two structure members 8, as shown in FIG. 5. At the end of each member 8 most adjacent the hooks 1 are angled faces, such as that shown at 9, there being a face 9 for each hook 1 and each face 9 having loosely mounted thereon a wedge 11. Each wedge is vertically restrained by face 9 and rests on a plate 61 and is horizontally restrained by a lip 62. The disposition of the wedges 11 is such that when the hooks 1 are in the engaged position the plane of the wedge 11 faces opposite the angled faces 9 is separated from the plane of the hooks 1, each wedge 11 being adjacent a hook 1. A light spring 12 biasses each wedge 11 towards the adjacent arm 2. Mounted on each arm 2 is a plunger 13 loaded by a spring 14 and so positioned that when the hooks 1 are in the engaged position each plunger 13 bears against a wedge 11 and biasses it away from the arm 2. The springs 14 are much more powerful than the springs 12.

Each structure member 8 (FIG. 5) contains a cylinder 15 containing an extensible piston 16 and connected via a pipe 17 to a breech 18 of a cartridge 19 mounted in the body 10. The breech 18 is also connected to a cylinder 20 containing an extensible piston 21 which bears against the arm 5a of the actuating crank 5.

The method of attaching a store to the unit will now be described. A store 30 (FIG. 1) has two saddles 31 secured thereto, the saddles being disposed longitudinally apart along the store. The distance between adjacent faces 32 of the two saddles is slightly greater than the distance between the furthest apart faces of the arms 2 of the ejector release unit when the hooks 1 are in the engaged position. In each face 32 are two apertures 33 having store facing surfaces 34.

A store 30 is offered up to an ejector release unit, the hooks 1 in the unit being in the disengaged position, until the wedges 11 bear against outward facing surfaces 35 of the saddles 31. The relative positions of one saddle 31, wedge 11, and hook 1 at this stage are shown in detail in FIG. 3.

A key (not shown) is inserted into the key hole 7 and turned to move the actuating crank 5, and hence the hooks 1 into the engaged position. In this position the hooks engage the apertures 33. At the same time the plungers 13 come into contact with the wedges 11 wedging them between the faces 9 of the members 8 and the faces 35 of the saddles 31. Each saddle 31 is thus securely held by the action of the wedges 11 pressing on the outward facing surfaces 35 and the hooks 1 bearing on the store facing surfaces 34 of the apertures 33.

Any movement of the store relative to the release unit caused by, for example, vibration, will allow the plungers 13 to move the wedges 11 further into the gap between the faces 9 of the members 8 and the faces 35 of the saddles 31. This results in a self tightening action.

Any store not ejected in flight may be easily removed by using a key and reversing the above described operation. Store ejection in flight is accomplished by firing the cartridge 19. Gas is then supplied to the cylinder 20, forcing the piston 21 to operate the crank 5 and thus disengage the hooks 1. Gas is also supplied to the cylinders 15, forcing the pistons 16 against the saddles 31 and ejecting the store from the release unit.

It will be apparent that there are many alternative mechanical constructions for the unit. For example, the wedges 11 may be carried on arms actuated by the crank 5 to enable them to be disengaged in a similar manner to the hooks 1. Also support members horizontally moveable relative to the body 10 may be used instead of pivotable arms 2 carrying support members in the form of hooks 1. It may in some cases facilitate store attachment if pressure is not applied to the wedges 11 until the support members are fully engaged with the saddles 31. This can be arranged by, for example, restraining the plungers 13 with the springs 14 compressed, using removable pins.

The saddles 31 as described and illustrated are adapted to be secured to existing stores using the tappings currently used for the lugs required by conventional ejector release units. It is envisaged that in future stores will be designed to take full advantage of ejector release units according to the present invention. In such stores the saddles may be partly submerged in the store, so causing less disturbance to the ballistic properties of the store. Saddles may also be formed as an integral part of the store.

A possible snag which may occur with some stores is overtightening of the wedges 11. This may be caused, for example, by the effect of flight loads on the store and may result in difficulty in manual release of a store. Two alternative wedge constructions are shown in FIGS. 6(a) and 6(b). In the wedge illustrated in FIG. 6(a), a wedge 51 comprises a portion 51a slideably mounted on a portion 51b. In the construction illustrated in FIG. 6(b) a wedge 52 has a portion 52a separated from a portion 52b by a spring 53.

What I claim is:

1. A store ejector release unit, for use with a store having a first saddle secured at a first site thereon and a second saddle secured at a second site thereon, the first and second sites being longitudinally separated, each saddle having relative to the store an outwardly disposed face and at least one inwardly disposed face, comprising:

a body having a first end and a second end;

a first structure member projecting from said first end to adjacent said first saddle and a second structure member projecting from said second end to adjacent said second saddle;

two wedges movably mounted on each of said first and second structure members and first spring means acting on each wedge so that the wedges on said first member are biased towards the wedges on said second member, and the wedges on said second member are biased towards the wedges on said first member;

a first pair of arms pivotably mounted on said body adjacent said first structure member and a second pair of arms pivotably mounted on said body adjacent said second structure member, said first and second pairs of arms being mounted between said first and second structure members, and a hook at a free end of each pivoted arm, each hook being disposed towards said adjacent structure member, a plunger slidably mounted on each of said arms and second spring means acting on each plunger biasing said plunger away from said arm towards said adjacent structure member, said second spring means being much more powerful than said first spring means;

a crank mounted on said body and centrally disposed between said first and second pairs of arms, a first tie rod operatively connecting said crank to said first pair of arms and a second tie rod operatively connecting said crank to said second pair of arms;

manually operable means for moving said crank between a first predetermined position where said hooks lie under said inwardly disposed faces of said saddles and said plungers bear against said wedges forcing said wedges into contact between said structure members and said outwardly disposed faces of said saddles, and a second predetermined position where said hooks do not lie under said inwardly disposed faces and said plungers do not bear against said wedges;

said hooks and said plungers being moved synchronously between positions corresponding to said first and said second predetermined positions of said crank;

and power operated means for moving said crank from said first predetermined position to said second predetermined position.

2. A store ejector release unit as claimed in claim 1, wherein said power operated means comprise a cartridge and a piston operatively connected to said cartridge, said piston acting on said crank.

3. A store ejector release unit as claimed in claim 2, further comprising a piston in each of said structure members, said pistons being operatively connected to said cartridge and arranged to bear downwardly against said outwardly facing surfaces of said saddles.

* * * * *